United States Patent [19]
> Duga et al.

[11] Patent Number: 4,551,163
[45] Date of Patent: Nov. 5, 1985

[54] ELECTRONIC GLASS FEEDER PLUNGER OPERATING MECHANISM

[75] Inventors: Robert J. Duga, Enfield; Constantine W. Kulig, Windsor; Robert L. Doughty, West Hartford; Robert J. Douglas, North Granby; Robert P. Andersen, Monroe, all of Conn.

[73] Assignee: Emhart Industries, Inc., Farmington, Conn.

[21] Appl. No.: 616,638

[22] Filed: Jun. 4, 1984

[51] Int. Cl.⁴ ............................................. C03B 7/08
[52] U.S. Cl. ..................................... 65/129; 65/158; 65/164; 65/328; 65/330
[58] Field of Search ................ 65/164, 129, 325, 330, 65/331, 158, 328

[56] References Cited

U.S. PATENT DOCUMENTS

| | | | |
|---|---|---|---|
| 2,950,571 | 8/1960 | Wythe | 65/164 |
| 3,502,457 | 3/1970 | Bublitz et al. | 65/164 X |
| 3,762,908 | 10/1973 | Labrot et al. | 65/158 |
| 3,874,866 | 4/1975 | Iacovazzi et al. | 65/164 |
| 3,998,616 | 12/1976 | Farabaugh | 65/99.5 X |

Primary Examiner—Arthur Kellogg
Attorney, Agent, or Firm—Arthur B. Moore

[57] ABSTRACT

A glass feeder plunger operating mechanism driven by an electric motor controlled by a programmable computer programmed to drive the motor in a predetermined manner in order to generate a predetermined motion profile of one or more glass feeder plungers. The plungers are secured to the end of a cantilevered lateral support bracket which is cyclically and vertically reciprocated by cyclical oscillations of the electric motor. The output shaft of the motor is connected to a ball screw in threaded engagement with a ball nut which is secured to a member connected to the plunger support bracket. The plunger support bracket is attached to a moveable vertical support shaft which maintains plunger alignment during the range of motion. The operating mechanism is attached to a frame which is adjustable in two dimensions to facilitate alignment of the plungers with their respective orifices. Air cylinders are provided to counter-balance the weight of the members being vertically reciprocated. Overload means is provided to limit plunger damage in the event excessive operating forces are encountered. Various sensor switches and adjusting means are disclosed to facilitate plunger alignment and control.

11 Claims, 17 Drawing Figures

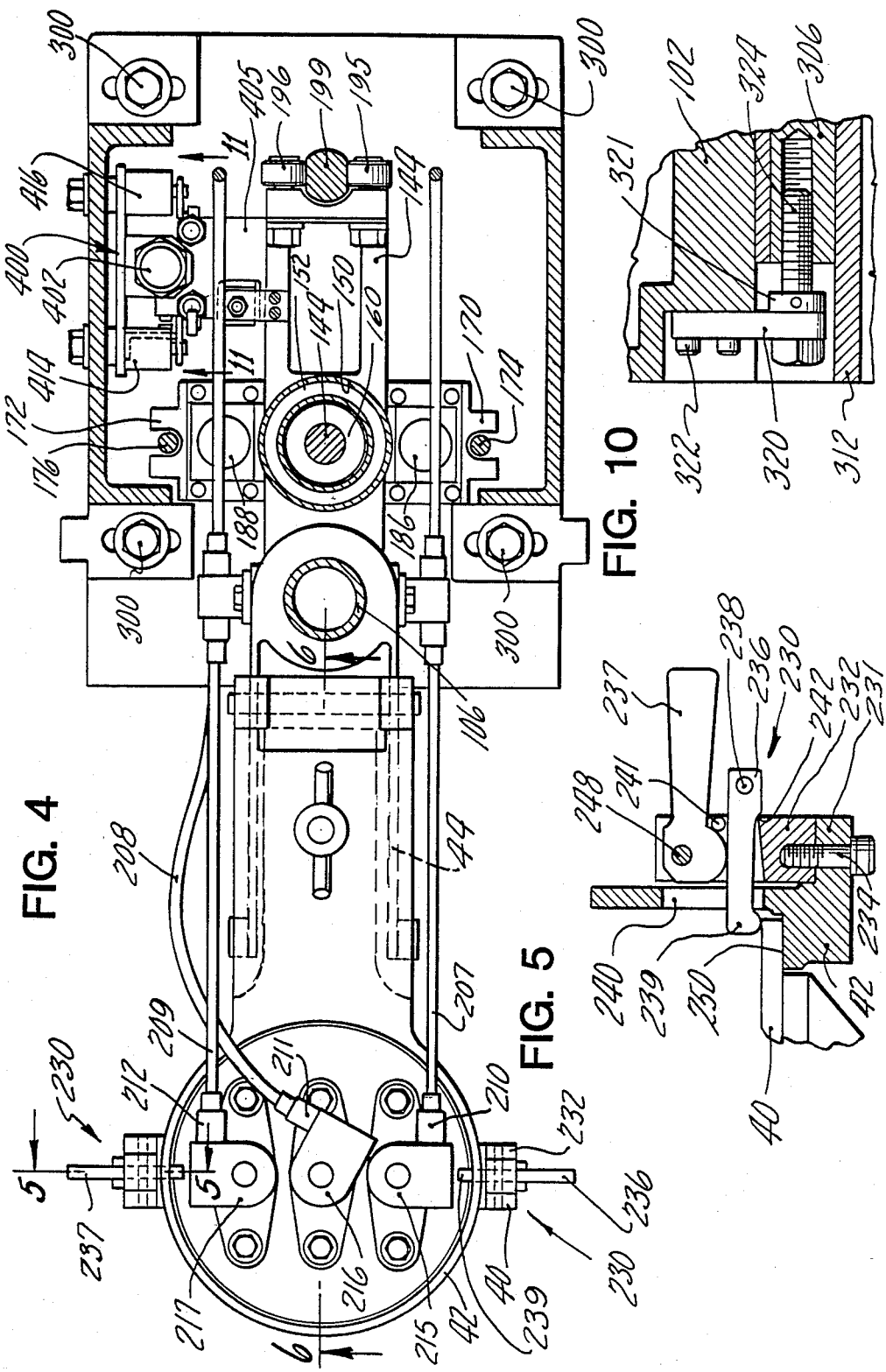

FIG. 11
FIG. 12
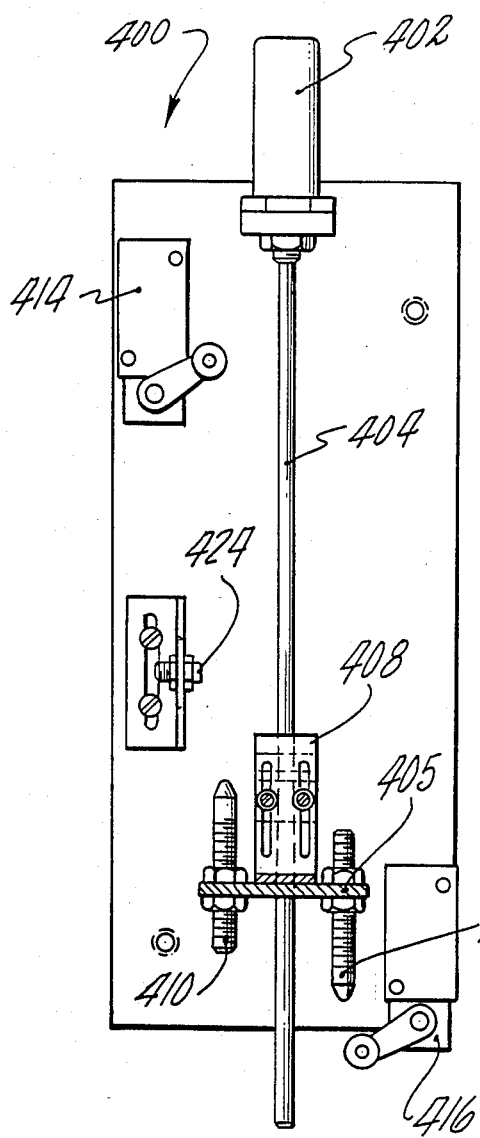
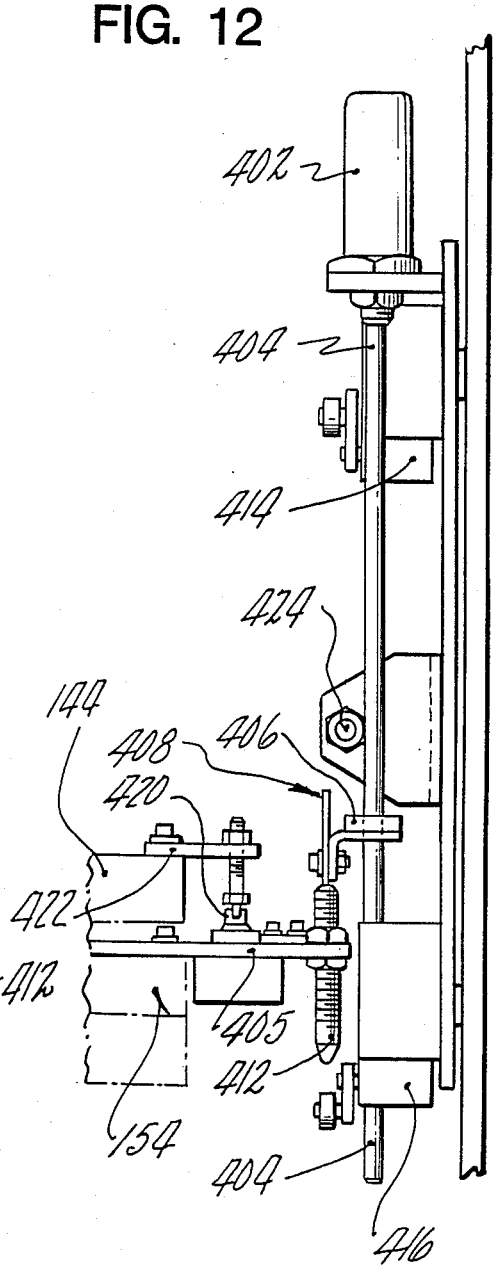

FIG. 14
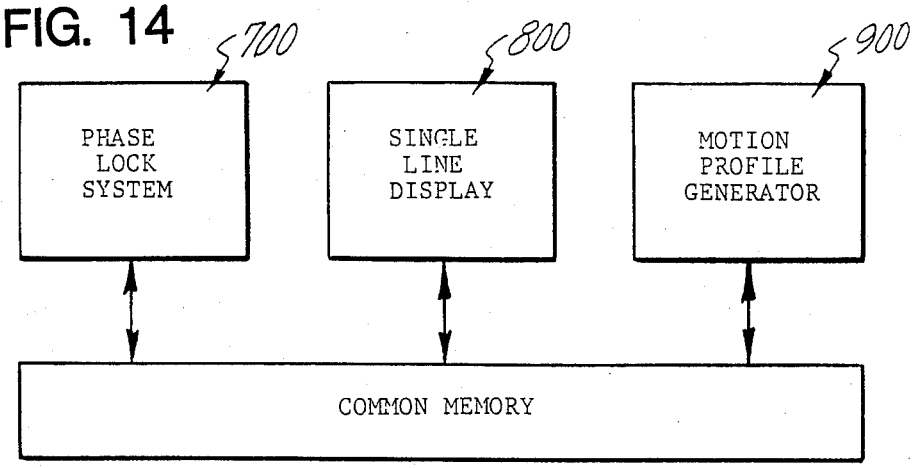
FIG. 15 PHASE LOCK SYSTEM
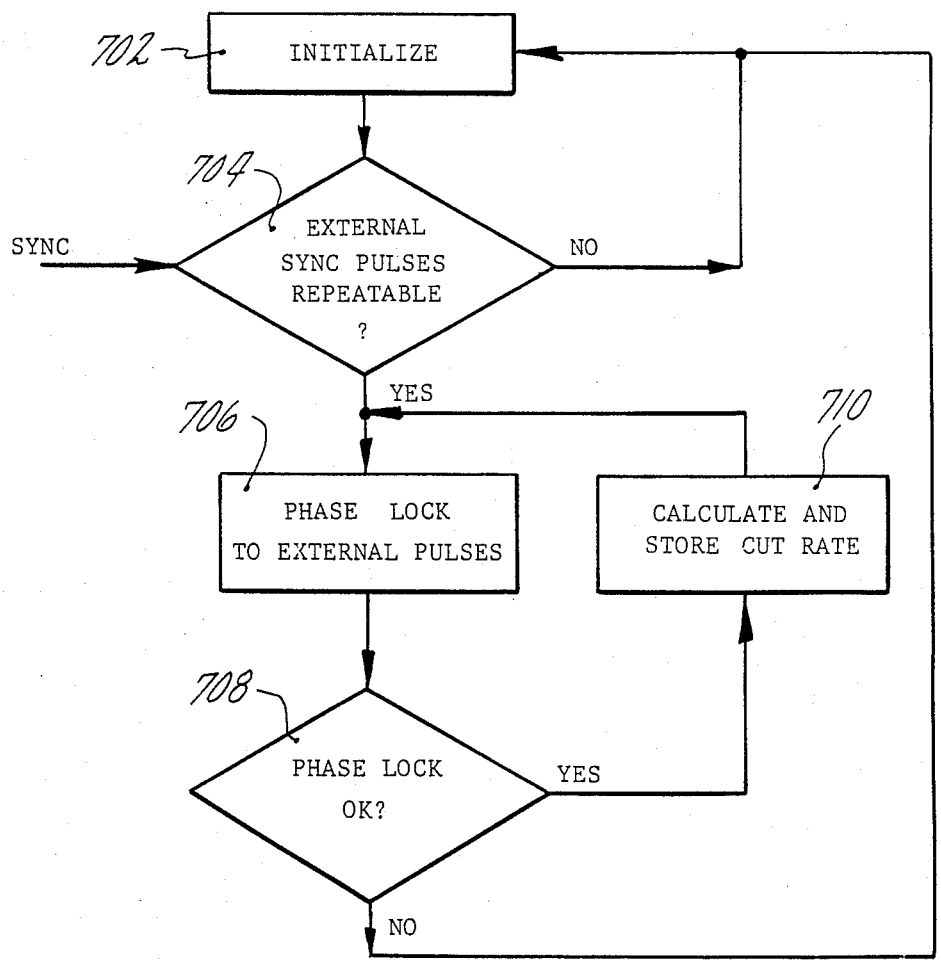

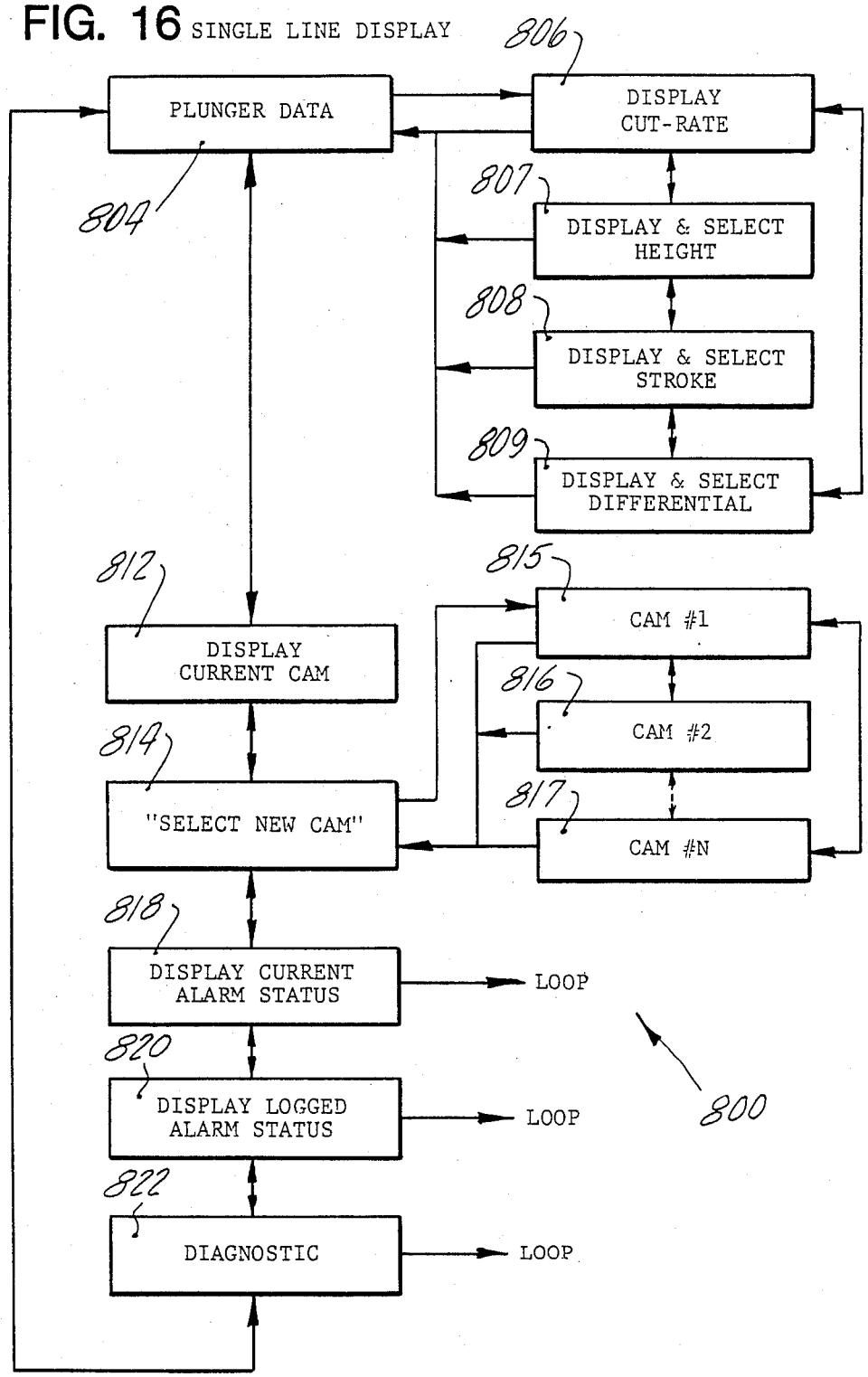
FIG. 16 SINGLE LINE DISPLAY

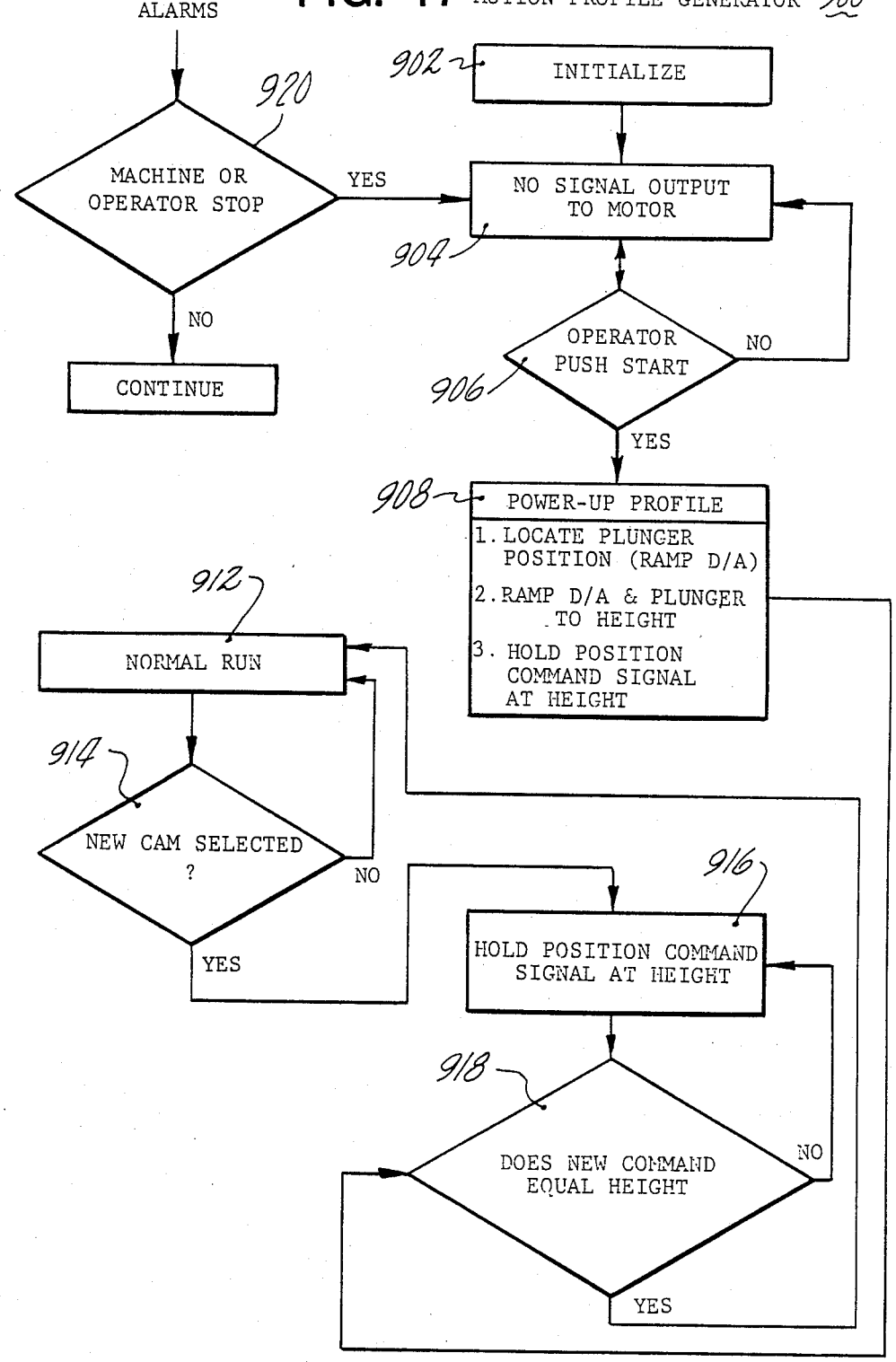
FIG. 17 MOTION PROFILE GENERATOR 900

ELECTRONIC GLASS FEEDER PLUNGER OPERATING MECHANISM

BACKGROUND OF THE INVENTION

1. Field of the Invention

This invention relates generally to glass feeder plungers and operating mechanism therefor. In particular, this invention relates to an apparatus for effecting the cyclically reciprocating motion of glass feeder plungers according to selectable predetermined motion profiles.

2. Description of the Prior Art

Glass feeder plungers operate in cooperation with shears and other components of glass feeders in order to control the manner in which molten glass is delivered to glassware forming equipment downstream of the feeder. A glass feeder may include one or more plungers, each axially aligned above an associated orifice in the bottom of the feeder bowl through which emanates a molten glass stream. Each plunger (and orifice) has associated with it a pair of shears, and all plungers and shears are synchronized with the glassware forming machine and operate cyclically in order to cut the respective stream into predetermined gobs of molten glass. Each plunger serves to control the speed with which the glass emanates from its associated orifice. Consequently, the cyclical motion of each plunger must be controlled in a predetermined manner in order to achieve desired gob shapes and weights. Plunger motion (velocity) profiles are dependent upon many variables including glass temperature and type, machine speed, the type and size of glassware to be produced, etc. Consequently, even with job changes, minor alterations of plunger motion profile are desirable to maintain optimum machine operation and speed. In addition to the motion profile of each plunger, adjustments of the plunger differential (i.e. phase relationship of plunger cam to shear cut), stroke length and height (i.e. defined as the lowest point of the plunger tip above orifice) also affect gob formation. Glass feeder plunger operating mechanisms often comprise one or more feeder plungers carried by a lateral support bracket that is cantilevered from a moveable vertical support shaft. The plungers of such prior art feeders are operated by mechanical mechanisms and driven by an assembly of levers and links from a rotating cam, the profile of which serves to effect the desired plunger motion profile. Changes in plunger motion profiles are obviously very difficult since they require replacement of the cam. Additionally, adjustments of plunger differential, stroke length and height are made very complex because of the need to adjust the array of levers and links (see for example U.S. Pat. No. 2,725,681).

Reference to several patents is helpful in order to describe the representative state of prior art plunger operating mechanisms. U.S. Pat. No. 2,725,681 discloses the use of a hydraulic servo motor operatively connected with the vertically operated plunger assembly to assist the cam in effecting reciprocating vertical plunger motion. The use of the hydraulic servo-motor is desirable because of the considerable weight of some feeder plungers. For example, feeder plungers may vary in size from approximately 2 to 7½" and in weight from 10 to 85 or more pounds. Because of the weight to be supported and moved vertically the components of the plunger operating mechanism must be strong enough to be suitable for the largest and heaviest plunger to be used in a particular feeder. This necessitates a continually heavy load on the feeder cam and on the cam driver (generally an electric motor).

U.S. Pat. No. 2,950,571 discloses the use of a hydraulic motor directly connected in line to the vertical shaft supporting a plunger. The hydraulic motor is responsive to signals from an electromechanical transducer which is provided to sense the plunger position. While the electromechanical transducer used in this system produces varying outputs representative of differently shaped cams, the apparatus is not capable of easily and repeatedly reproducing selected cam profiles. The various wave forms simulating various cam profiles are produced by varying the phase of the harmonic motion of synchro transducers used in this system. The manual adjustment of a complex array of gears varies this phase. The system disclosed in this patent is operated from a synchro transmitter connected to the output shaft of the electric motor which drives the glassware forming machine itself. The output of the synchro transmitter is connected to a mechanism box which produces electrical signals to activate the hydraulic motor via an electrically actuated hydraulic plunger valve. These signals are responsive to feedback from the electromechanical transducer.

U.S. Pat. No. 4,382,810 discloses a programmable timing controller for synchronizing the operation of one or more sections of a glassware forming machine with one another and with machine components common to all sections. The controller provides drive signals to an electro-hydraulic stepper motor common to both a gob feeder plunger mechanism and a conveyor and connected to each via respective gear reducers. The relative speeds of the plunger and conveyor mechanisms are fixed and established by the gear ratios. The pulse repetition rate of the drive signal is predetermined or controlled by an operator via a computerized speed control. This patent merely discloses one way of synchronizing plunger operation to that of other IS machine components and does not address the aforementioned problems associated with prior art plunger operating mechanisms.

U.S. Pat. No. 3,502,457 discloses a system for controlling the width of a glass ribbon emanating from a forehearth. A regulator or needle is aligned above the orifice and the height of the needle is adjusted as a function of the output of sensors used to detect ribbon width. The regulator is suspended from a block mounted to slide within vertical trackways and the block is in threaded engagement with a threaded shaft connected to a reversible stepping motor. Rotation of the motor in a selected direction raises or lowers the regulator accordingly. While this patent bears a superficial similarity to the invention disclosed herein it is noted that the device shown in this patent is not suitable for rapid, cyclical operation of a glass feeder plunger according to a selected velocity ormotion profile.

An additional disadvantage associated with prior art feeder plunger operating mechanisms is that their basically mechanical construction requires an operator to make many necessary adjustments directly at the location of the mechanism, right above the feeder bowl containing molten glass. In addition to the obvious hazard to the operator there is the risk that tools may be dropped into the feeder causing significant damage downstream.

Also, many prior art feeder plunger mechanisms rely on gravity to bring the plungers down, thus limiting machine speed since the plungers must follow the cam profile.

In view of the deficiencies of the prior art systems it is an object of this invention to provide a programmable control system and feeder plunger operating mechanism to facilitate use of preprogrammed plunger motion profiles.

It is another object of this invention to provide a feeder plunger operating mechanism wherein the plunger motion profile may be altered during plunger operation.

It is yet another object of this invention to provide a feeder plunger operating mechanism wherein the plunger height, stroke and differential may be adjusted remotely and during plunger operation.

It is still another object of this invention to provide a feeder plunger operating mechanism wherein the plungers are positively driven in both directions by a reversible electric motor.

SUMMARY OF THE INVENTION

These and other objects of this invention are achieved by the embodiment disclosed herein which is, in a feeder plunger operating mechanism for use with at least one feeder plunger, said plunger attached to a common support, the improvement comprising: a reversible electric motor operatively connected to positively drive said common support in a cyclically reciprocating manner and a programmable control means operatively connected to said electric motor to cause its output shaft to oscillate between predetermined limits and according to a predetermined cyclical motion profile thereby causing it to move said common support in a predetermined manner. As used herein the term "reversible" is intended to cover all electric motors capable of changing the direction of movement of their output shafts. In particular, the preferred embodiment disclosed herein is a feeder plunger operating mechanism comprising: a frame; a vertical support shaft attached to said frame so as to permit vertical reciprocating motion of said shaft relative to said frame; a cantilevered plunger support bracket secured to said vertical support shaft for supporting, one or more feeder plungers at the distal end of said plunger support bracket; an extension member secured to the other end of said support bracket; an electric motor mounted on said frame; a threaded rod for being driven by said motor, said rod extending parallel to said vertical support shaft, said rod being rotatable relative to said frame; a nut in threaded engagement with said threaded rod and fixedly secured to said extension member; programmable control means operatively connected to said motor for causing same to cyclically oscillate said threaded rod to thereby vertically reciprocate said plunger support bracket according to a predetermined cyclical motion profile.

BRIEF DESCRIPTION OF THE DRAWINGS

FIG. 4 shows a plan view of a portion of FIG. 1 taken substantially along the line 4—4.

FIG. 5 shows a more detailed view of a portion of FIG. 4 taken along the line 5—5.

FIG. 10 is a sectional view of FIG. 2 taken along the line 10—10.

FIG. 11 is a front elevation view of the transducer assembly of the invention.

FIG. 12 is a side elevation view of the transducer assembly shown in FIG. 11.

FIG. 14 is a diagrammatic showing the interrelationship of three software sub-systems of the control system of the invention.

FIGS. 15, 16 and 17 are more detailed diagrammatic flow charts showing the functional operation of the three sub-systems shown in FIG. 14.

DESCRIPTION OF THE PREFERRED EMBODIMENT

Figure 1:
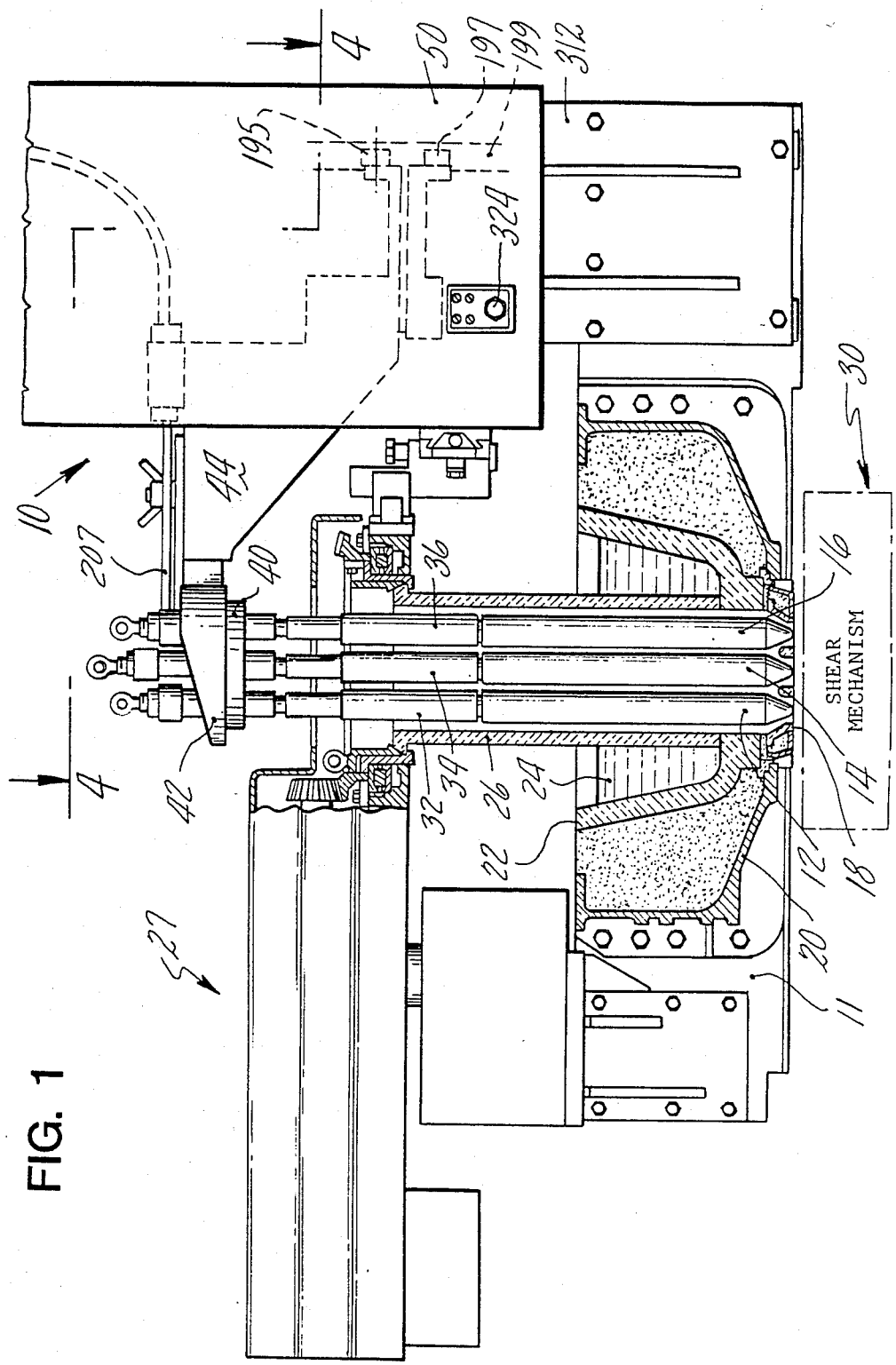
FIG. 1 shows a front elevational view partly in cross-section of a feeder plunger operating mechanism in operative relationship to a tube rotating mechanism and other portions of a feeder.

Referring now to FIG. 1 there is shown a front elevation view, partly in cross-section, of a feeder plunger operating mechanism 10 constructed in accordance with the principles of this invention. As will be explained below, operating mechanism 10 vertically reciprocates glass feeder plungers 12, 14 and 16 relative to their respective orifices in orifice ring 18 secured to the bottom of feeder bowl 20 beneath spout 22.

Operating mechanism 10 is mounted by angle bracket 312 to the front 11 of a conventional glass forehearth. As is well known to those skilled in the art, other conventional structures attached to the front of the forehearth comprise the feeder bowl and spout containing molten glass 24, refractory tube 26 (operatively positioned inside spout 22 and rotated by tube mechanism 27) and shear assembly 30 for shearing the molten glass streams emanating from orifice ring 18 into discrete gobs.

Plungers 12, 14 and 16 are secured to plunger chucks 32, 34 and 36, respectively, which are in turn mounted on a plunger carrier disk 40. As will be understood below, disk 40 is attached to plunger banjo frame 42 which is in turn secured to lateral plunger support bracket 44. The actuating means by which plunger support bracket 44 is vertically reciprocated is located within housing 50 which serves to protect the operating mechanisms from the hostile environment and facilitates cooling air circulation (by duct means not shown).

Figures 2, 3:
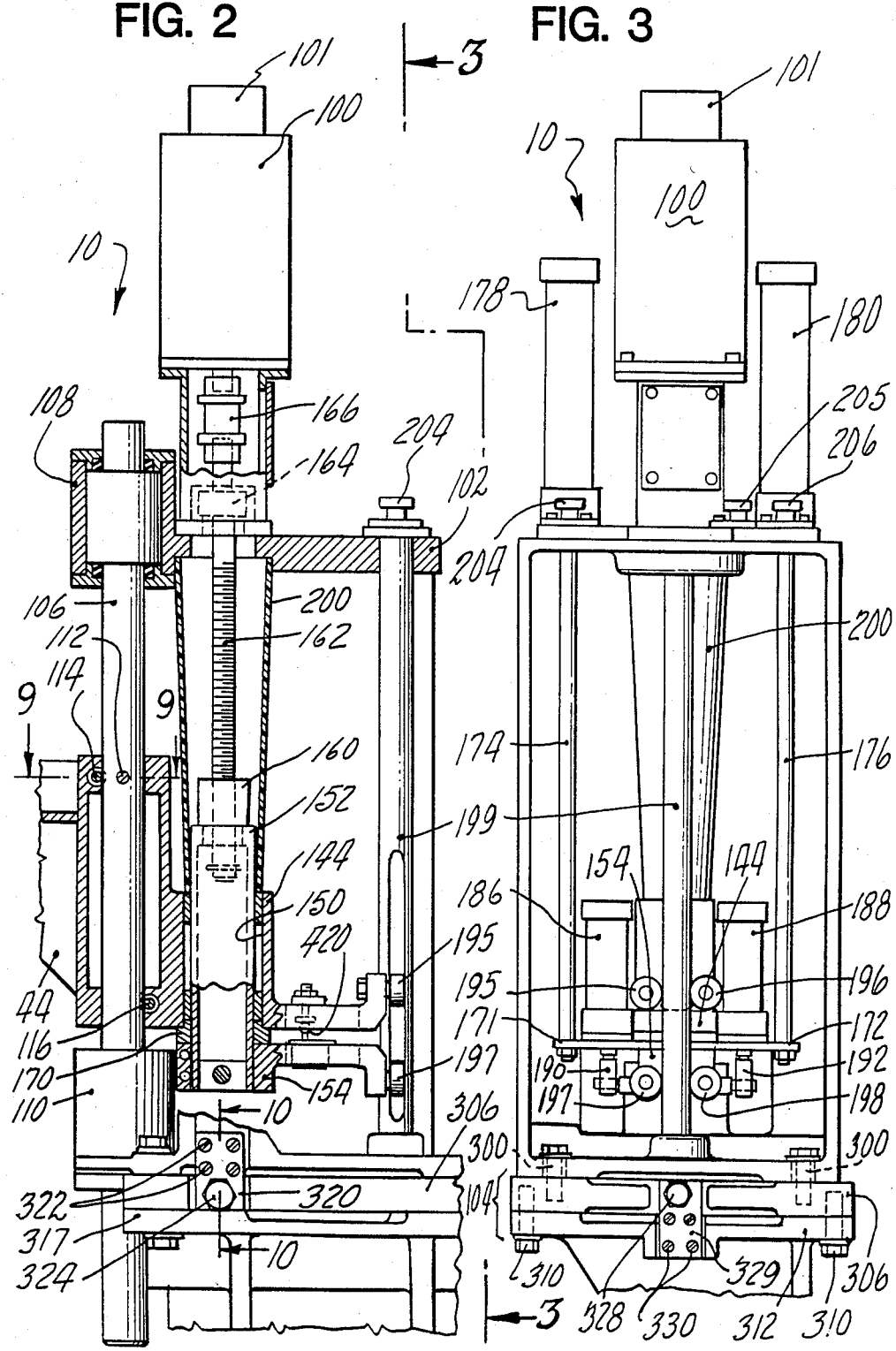
FIG. 2 shows a more detailed front elevation view of a portion of FIG. 1, partly in cross-section.
FIG. 3 shows a side elevation view taken along line 3—3.

The details of the actuating means are shown in FIGS. 2, 3 and 4 wherein housing 50 has been omitted for clarity. The actuating means of feeder plunger operating mechanism 10 comprises electric motor 100 and other members operatively connecting it to plunger support bracket 44 as explained below. Motor 100 and tachometer 101 are connected to control system 600 (best seen in FIG. 13) although all electrical connections are omitted from the drawings for the sake of clarity. Operating mechanism 10 is mounted within housing 50 to frame 102 which is attached to an X-Y adjusting mechanism 104 the operation of which will be explained below.

Plunger support shaft 106 is mounted so as to be free to slide within bushings 108 and 110 which are affixed to frame 102. Plunger support bracket 44 is secured to shaft 106 by a positioning pin 112 and additionally secured by the wedging action of rods 114 and 116 (best seen in FIG. 9). Plunger support bracket 44 includes another bracket or extension member 144 which may either be a separate member or integrally cast with plunger support bracket 44. As best seen in FIG. 4, extension member 144 is, in the preferred embodiment, on the side of shaft 106 diametrically opposite the plunger banjo and has an aperture 150 diametrically opposite banjo frame 42. Aperture 150 is for receiving an overload or override shaft 152, therethrough the bottom end of override shaft 152 being secured to override guide plate or bracket 154. Ball nut 160 is affixed to the top of override shaft 152 and threadably engaged with ball screw 162 which is connected with appropriate bearings 164 and couplings 166 to the output shaft of motor 100. Ball screw 162 extends sufficiently into the interior of override shaft 152 so as to always be in threaded engagement with ball nut 160 during operation.

Plate 170 having flange portions 171 and 172 (best seen in FIGS. 3 and 4) is attached to extension member 144. The flange portions serve as points of attachment for rods 174 and 176 respectively. These rods are attached to the pistons of plunger assist cylinders 178 and 180 respectively. Each of these cylinders is provided with a predetermined amount of air pressure (through ports not shown) to produce a predetermined upwardly directed counterbalancing force offsetting the weight of plunger support bracket 44 and all components attached thereto which must be reciprocated during feeder operation. Alternatively, it will be apparent to those skilled in the art that other counterbalancing arrangements may be utilized; for example, springs may replace cylinders 178 and 180.

Override shaft 152 is free to reciprocate within aperture 150. Therefore, override cylinders 186 and 188 are used to provide a force of attraction between extension member 144 and override guide 154. Each of these cylinders is affixed to plate 170 although the piston rods of each override cylinder pass through apertures (not shown) in plate 170 and are connected to override guide 154 by linkage assemblies 190 and 192. Override cylinders 186 and 188 are provided with a predetermined amount of air pressure (through ports not shown) to produce a predetermined upwardly directed force biasing override guide 154 to plate 170 and therefore to extension member 144. This constitutes a force limitation arrangement whereby the downwardly directed force from motor 100 is transferred to the plungers through the override cylinders and if it exceeds the upwardly directed pre-load force of the cylinders, plate 170 and extension member 144 separate from override guide 154, thus limiting plunger damage in the event of stones, etc. During operation the air pressure supplied to the override cylinders would be set to produce a force of attraction slightly above the minimum required to prevent separation for the particular plunger motion profile being used. This air pressure may be automatically adjusted by the control system. As with the aforementioned alternative arrangements for cylinders 178 and 180, springs could also be used to replace cylinders 186 and 188.

Extension member 144 is provided with plain camroller 195 and adjustable (eccentric) camroller 196 and override guide 154 is provided with plain camroller 197 and adjustable (eccentric) camroller 198. All these rollers are mounted so as to be adjacent guide rod 199 (affixed at both ends to frame 102) and serve to prevent rotation of plunger support bracket 44, ball nut 160, override shaft 152 and override guide 154 about bearings 108 and 110.

Operating mechanism 10 is further provided with a protective cover 200 for ball screw 162. In the preferred embodiment, cover 200 is in the form of a spiral, conically telescoping structure although other arrangements may be suitable. Operating mechanism 10 is further provided with remote plunger height adjusting knobs 204, 205 and 206, each of which is connected to a flexible cable 207, 208 and 209, respectively. The other end of each flexible cable is connected via quick disconnect couplings 210, 211 and 212 to plunger height adjusting gear boxes 215, 216 and 217 (best seen in FIGS. 4 and 6). Each of the gear boxes includes a worm gear 218 in operative engagement with a spur gear 219 in threaded engagement with threaded shaft 220 connected to the top of a respective one of the plunger chucks 32, 34 and 36. Each threaded shaft is keyed (not shown) to prevent its rotation, and consequently, rotation of a selected adjusting knob causes rotation of the associated worm and spur gears and consequent vertical adjustment of the associated plunger chuck. Alternatively, the outer plungers in a triple gob mechanism could be adjusted by remote plunger height adjusting knobs 204 and 206. The center plunger may be adjusted by setting motor 100 to a different "height" and then aligning the outer plungers manually. Two annular, corrugated-type tolerance rings 217 are inserted intermediate each plunger chuck and its housing in order to provide firm radial support while enabling axial motion during plunger chuck height adjustment. (For clarity, adjusting knobs 204, 205 and 206 and a portion of flexible cable 208 are omitted from FIG. 4.) Prior art structures utilize a threaded shaft attached to each plunger chuck and a complementarily threaded support bracket or nut. Plunger height adjustment with this arrangement was possible only by the operator directly turning the nut.

Referring now to FIGS. 4 and 5 there is shown an improved locking apparatus 230 for quickly and easily securing plunger carrier disk 40 to banjo 42. Each apparatus 230 comprises a mounting block 232 secured by bolt 234 to a flange 231 on banjo 42. In the preferred embodiment there are two such apparatuses 230 mounted to banjo 42 at diametrically opposite points (although a greater number may be used). Each mounting block 230 is provided with a slidable locking lever 236 and a pivotable cam lever 237. Locking lever 236 has a transverse pin 238 in one end for serving as a handle. The other end 239 of locking lever 236 extends through an aperture 240 in the peripheral surface of the banjo. Locking apparatus 230 is provided with a pin 241 at a predetermined distance from edge 242, the distance being smaller than the expanded ends of locking lever 236 so the lever can only slide within apparatus 230 and remains with it. A carrier disc may be secured to banjo frame 42 by sliding each locking lever 236 radially inward until ends 239 are over the carrier disc. The other end of each locking lever is sized so pin 241 prevents lever 236 from excessive radially inward movement. When cam lever 237 is rotated clockwise about its axis pin 248 it will exert sufficient locking force on locking lever 236 to cause it to hold plunger carrier disk 40 against the rim surface 250 of banjo 42.

Figure 6:
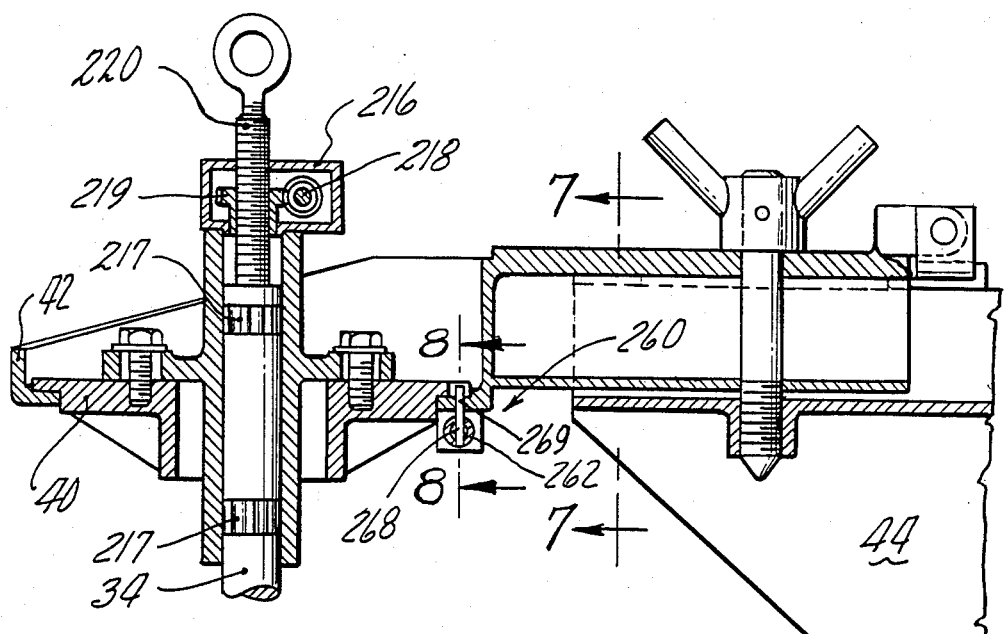
FIG. 6 shows an elevation view of FIG. 4 taken substantially along the line 6—6.
Figure 7:
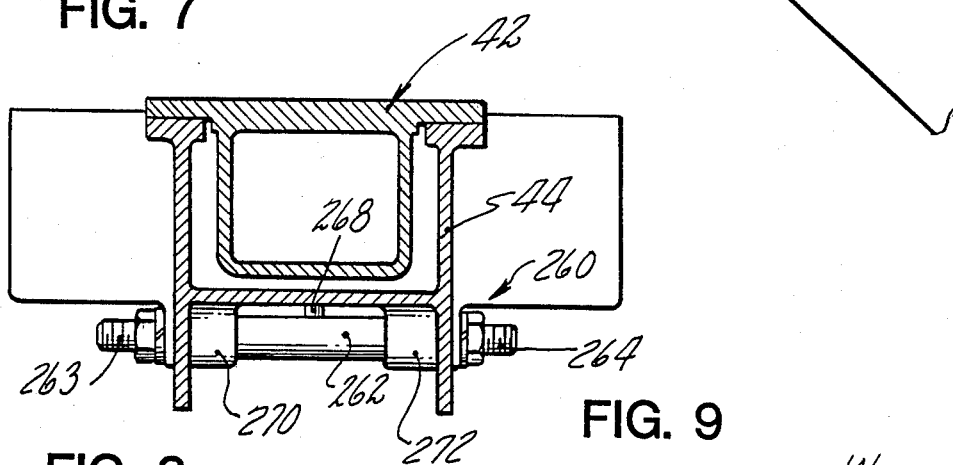
FIG. 7 is a sectional view of FIG. 6 taken along the line 7—7.
Figures 8, 9:
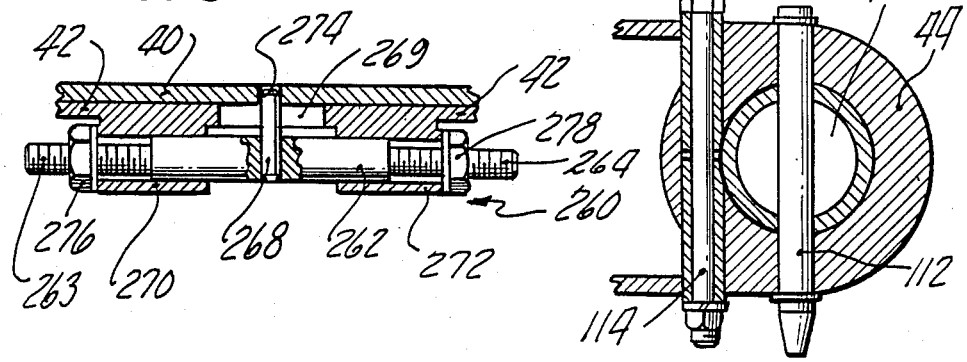
FIG. 8 is a sectional view of FIG. 6 taken along the line 8—8.
FIG. 9 is a sectional view of FIG. 2 taken along the line 9—9.

Referring now to FIGS. 6, 7 and 8, there is shown a plunger shear angle adjusting mechanism 260. Mechanism 260 comprises a rod 262 with threaded ends 263 and 264. Rod 262 has a radially extending pin 268 secured in a transverse bore. Mechanism 260 is mounted to the bottom side of banjo 42 in bosses 270 and 272 which have throughbores permitting axial movement of rod 262. Mechanism 260 is mounted such that pin 268 passes through a slot 269 in the bottom side of banjo 42 and into an aperture 274 in carrier disk 40. Mechanism 260 is further provided with locking nuts 276 and 278 the rotation of which will cause axial movement of rod 262 and consequently cause pin 268 to rotate carrier disk 40 about a vertical axis which is in substantial alignment with the feeder spout.

As mentioned above, operating mechanism 10 is provided with an X-Y adjustment means best seen in FIGS. 2, 3 and 10. Frame 102 is secured by four bolts 300 to center plate 306 which is in turn secured by four bolts 310 (only two shown) to angle bracket 312 which (as best seen in FIG. 1) is secured to the front of the forehearth. The construction of the X adjustment mechanism is shown in greater detail in FIG. 10. Plate 320 is secured by four bolts 322 to main frame 102. Bolt 324 is rotatably secured to plate 320 by clamp collar 321 and is in threaded engagement with center plate 306. It will be understood that loosening the four bolts 300 and rotating bolt 324 will cause frame 102 to slide along center plate 306 thereby effecting an adjustment in the X direction. Suitable cooperating guide channels, not shown, are milled into the the bottom of frame 102 and top of center plate 360 in order to assure relative linear motion during any X adjustment. The Y adjustment is achieved in a similar manner, although the Y adjusting bolt 328 is in threaded engagement with center plate 306 at a location 90° away from bolt 324 and the Y adjustment plate 329 is secured by bolts 330 to the angle bracket 312.

Referring now to FIGS. 4, 11 and 12 there is shown a transducer and limit switch assembly 400 which is secured to the interior of frame 102. Assembly 400 comprises non-contact plunger position transducer 402 which, in the preferred embodiment, utilizes a magnetostrictive principle, having an ultrasonic waveguide in vertical rod 404. Transducer magnet 406 encircles rod 404 and is attached by adjustable bracket assembly 408 via plate 405 to override guide 154. Also attached to plate 405 are adjustable upper and lower threaded rods 410 and 412, respectively. As override guide 154 vertically reciprocates between predetermined limits, rods 410 and 412 will approach upper and lower limit switches 414 and 416, respectively, which will provide appropriate signals in the event any preset limit of plunger motion is exceeded. Also shown in FIG. 12 is override proximity sensor 420 attached to plate 405 with a corresponding probe attached to extension member 144 via adjustable bracket assembly 422. This sensor will provide an appropriate signal to the control system if extension member 144 is separated from override guide 154. A proximity sensor 424 is shown in FIG. 11 and serves as a datum sensor for sensing the passage of a portion of plate 405 and producing for the control system a reference pulse identifying a reference position of the plungers. It will be understood that other position transducers could be utilized; for example, motor 100 could be provided with a resolver or encoder the output of which could be correlated to plunger position.

Figure 13:
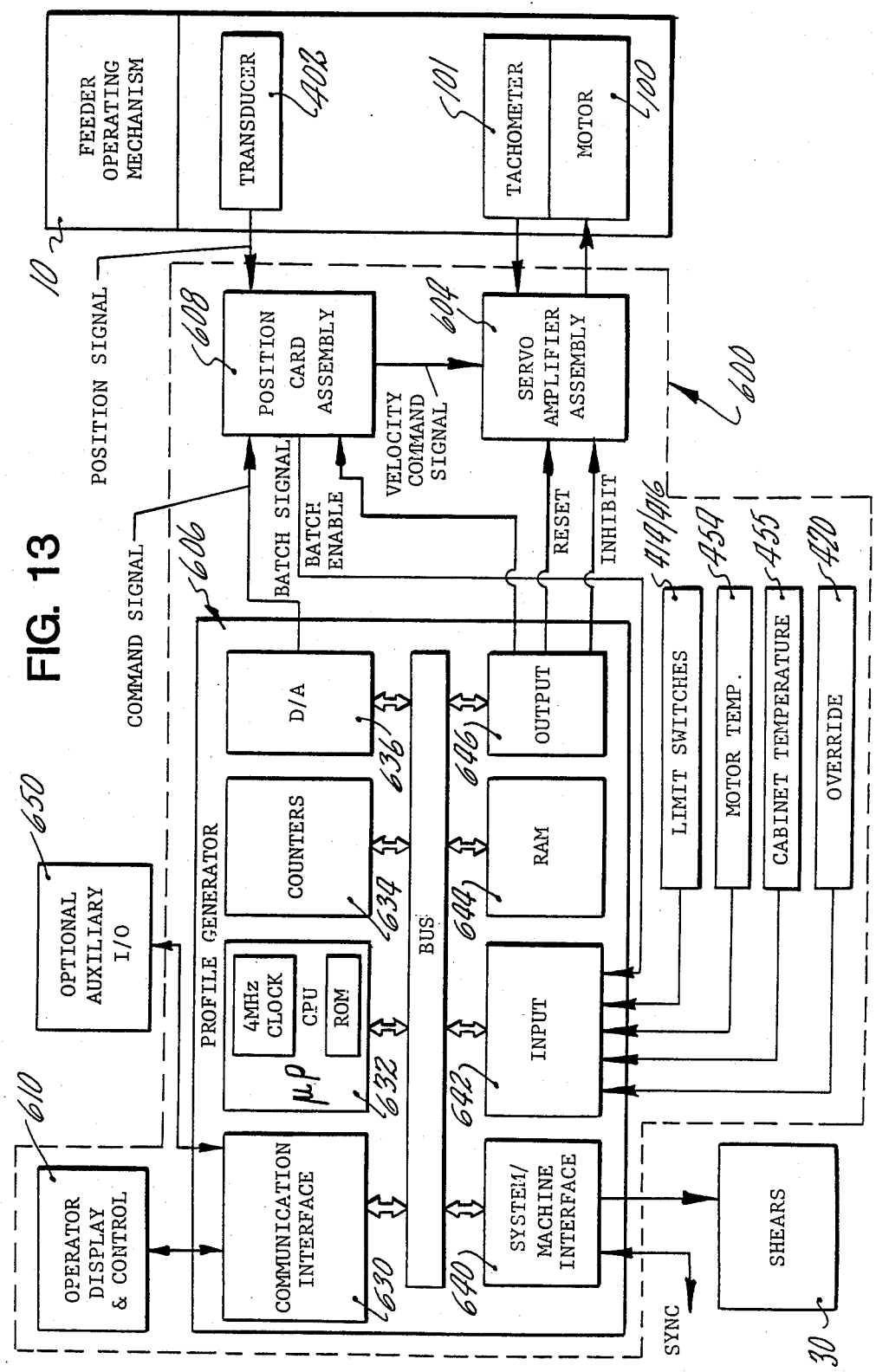
FIG. 13 is a block diagram of the control system of the invention.

Referring now to FIG. 13 there is shown a schematic block diagram of control system 600 for controlling operating mechanism 10 (which for clarity is diagrammatically represented by the block labelled "feeder operating mechanism"). Control system 600 includes as functional components a servo amplifier assembly 604, a plunger position profile generator 606, plunger position card assembly 608 and the operator's display and control assembly 610.

Profile generator 606 may be, for example, a conventional microprocessor based unit which, in the preferred embodiment includes a communications interface card 630, CPU card 632, counter card 634, digital to analog converter 636, system/machine interface card 640, input card 642, RAM 644 and output card 646.

Communications interface card 630 interfaces profile generator 606 with operator display and control unit 610 and an optional auxiliary input/output unit 650 which may be, for example, a computer based system for interfacing control system 600 with other glassware forming machine control systems, tape drives, CRT's, etc. In the preferred embodiment operator display and control unit 610 comprises an alphanumeric display with associated key pad operating in a menu driven format which will be explained below. CPU card 632 includes a conventional microprocessor, read only memory (ROM) and, in the preferred embodiment, a 4 MHz clock. Counter card 634 includes several counter timing chips which operate in conjunction with the 4 MHz clock to provide a phase clock, the operation of which will be described below. D/A converter 636 interfaces profile generator 606 with position card assembly 608. The output of D/A converter 636 is a position command signal which, as will be explained below, is the electronic profile corresponding to the cam selected by the operator. As will also be understood below, during the start-up procedure the position command signal is a simple ramping voltage rather than the cam signal. While the ROM stores a plurality of groups or tables of 256 normalized data points (each point being, for example, a 16 bit integer) representative of the various mechanical cam profiles that an operator is familiar with, the system is programmed to combine a selected group of normalized data points with operator inputs (i.e. plunger data) to produce the position command signals. The various cam shapes may be preprogrammed or downloaded from an external source.

System/machine interface 640 serves to interface control system 600 with other portions of the glassware forming machine. Control system 600 may also be operated from an internal or external sync. In the external mode interface 640 receives a sync input from an external source which may be a signal from a mechanical proximity switch on shaft driven systems or the output of the main inverter used to drive all synchronous motors operating within and in conjunction with the glassware forming machine. In the internal mode interface 640 will act as a master clock and output a sync signal to be used by all other machine components. Interface 640 also provides a synchronized cut rate output to shears 30. In the external mode the operator may only display the cut rate which is adjustable by conventional means. In the external mode the operator may enter the desired cut rate via operator display and control unit 610. Input card 642 is used to receive the various alarm inputs from override sensor 420, limit switches 414/416 (both best seen in FIGS. 11 and 12) and other alarm sensors such as motor temperature sensor 454 and feeder operating mechanism cabinet temperature sensor 455. An input on any of these lines will inhibit operation of control system 600 until the situation is cleared. Input card 642 also receives a latch signal input from position card assembly 608, the operation of which will be described below.

RAM 644 serves a conventional function as a common memory, the function of which will be described in part below with respect to FIG. 14. Output card 646 provides appropriate reset and inhibit signals to servo amplifier assembly 604 and a latch enable signal to position card assembly 608.

The 4 MHz clock is used as a source of interrupts for the microprocessor via a "÷4000" circuit (not shown) and as source pulses for the aforementioned phase clock. The phase clock may be a hardware or software system, the output of which in the preferred embodiment runs sequentially from 0–4096 counts during each cut cycle. Control system 600 is programmed to read the value of the phase clock output each millisecond, the first eight bits of this output representing a memory address in ROM and the last four bits repesenting some value between 0 and 15. Each ROM address contains one of the aforementioned normalized data points. The system interpolates between the values at the indicated address and the next sequential address as a function of the value of the last four bits. The 16 point interpolation enhances the resolution of the position command signal output from D/A card 636. This command signal represents, in effect, the desired plunger position which is combined with the position signal output of output 402 (amplified by a certain gain) and results in a velocity command signal output from position card assembly 608 to servo amplifier assembly 604. The result is an error signal command to motor 100.

As noted above, position card assembly 608 receives a latch enable signal from output card 646 and produces a latch signal for input card 642. While not shown in detail, position card assembly includes a latch circuit which serves as a switch to assure that no velocity command signal is output to servo amplifier assembly 604 unless the position signal output of transducer 402 indicates that the plungers are at a position corresponding to the command signal from D/A converter 636. This latch circuit is enabled only when the latch enable output of card 646 goes high. The operation of the latch circuit will be described below with respect to the power-up profile in FIG. 17.

As diagrammatically shown in FIG. 14, control system 600 comprises three parallel subsystems: Phase Lock System 700, Single Line Display System 800 and Motion Profile Generator System 900. Each of these three subsystems operates independently of the other, although the outputs are available in a common memory which may be RAM 644.

The operation of the phase lock system is shown in somewhat more detail in FIG. 15. After the system has been initialized in block 702, a determination is made in decision block 704 as to whether the sync pulse signal received from an external source is acceptable. In the internal mode this step is unnecessary. As will be understood by those skilled in the art, the sync input may be normalized to a predetermined form such as one pulse per cut cycle. Small variations in the pulse length from cycle to cycle may be tracked by the system which will then proceed to a phase lock loop block 706 to lock the phase of control system 600 to the external sync. Block 708 monitors the phase lock and returns the program to block 702 if synchronization is lost. Otherwise the system calculates the cut rate and stories it in memory in block 710. Malfunctions or large deviations in successive pulse lengths will be detected in block 704 which will inhibit further operation of control system 600 until acceptable sync inputs are received.

Referring now to FIG. 16 there is shown a functional flow chart describing the general operation of the single line display system 800. It will be understood that while the preferred embodiment uses a single line display which is conveniently operated in a sequential menu driven format other well known displays may be used. This system consists of a main menu portion and various loops, each portion of the system being accessible to the operator through conventional use of "DO", "NEXT", "PREVIOUS" and "EXIT" keys on the keypad of control unit 610. The first item in the main menu is plunger data block 804 which enables the operator, upon pressing the "DO" key, to sequentially display cut rate in block 806, and display and enter height in block 807, stroke in block 808 and differential in block 809. In the internal mode the operator can also enter the desired cut rate at block 806. In order to facilitate an operator's transition from a mechanical to electronic plunger operating mechanism all the input parameters are expressed and displayed in numbers and terms familiar to the operator; even cam designations. After these various parameters have been established, the operator then exits the plunger data loop and proceeds to block 812 where system 800 will display the current cam being utilized. The operator then proceeds to block 814 to enable the operator to select a new cam if desired and to block 815, 816 and 817 to sequentially list the cams 1 to N which are stored in ROM and available for selection. The operator may then proceed to block 818 to enter a current alarm status loop (not shown) and to block 820 to enter a logged alarm status loop (not shown) if desired. The last menu item is a diagnostic block 822 suitable only for system maintenance.

There is a relationship between most of the operator input parameters which precludes the operator's selection of certain mutually inconsistent values. For example, a particular stroke and cut rate selected by an operator may not be achievable with certain cam profiles because of stresses imposed upon the mechanism. There is a cut rate limit for each cam profile, the limit varying depending upon the stroke. Control system 600 is programmed to calculate the cut rate limit for all combinations of input parameters and accept only valid operator selected cut rates.

Referring now to FIG. 17 there is shown a functional flow chart representing the motion profile generator 900. After initialization in block 902 the system proceeds to block 904 and turns off the latch enable signal from the output card to the position card assembly to inhibit the velocity command signal to the servo amplifier assembly. The system then determines in block 906 whether the operator has activated the start command and if he has proceeds to the power-up profile in block 908. The power-up profile consists essentially of three functions: the first being to determine the actual plunger position signal as output by the transducer, the second being to ramp the output of D/A converter and the plunger to height (i.e. lowest point in stroke) and the third being to hold the position command signal at height. The D/A output is ramped from one extreme (minimum or maximum) toward the other independently of the ROM data point. When the D/A output equals plunger position the latch circuit sends a latch signal to the input card and the system then addresses that ROM address storing a value representative of height and communicates that value to D/A converter 636 to ramp the plunger to height. The plunger then waits at height as the phase clock cycles through its counts until a determination is made in block 918 that the phase clock points to that command signal in ROM which equals the current position command signal from the D/A converter (i.e. height). The system will then enter the normal run mode in block 912 by communicating the ROM data points sequentially to the D/A converter. The converter output will then follow the stored cam profile. At this point the control system 600 continues in this mode until a new cam is selected by the operator in block 914. Upon the selection of a new cam, the plunger is stopped momentarily in 916 by holding the position command signal output of the D/A converter at height until it is determined in block 918 that the actual plunger position equals the new command signal, at which point normal operation continues in block 912. The motion profile generator also includes decision block 920 which receives inputs if the various alarm sensors are triggered and turns off the latch enable signal to return system control to block 904.

In addition to the embodiment disclosed herein alternative embodiments are possible. For example, a separate electric plunger may be operatively associated with each plunger via appropriate plunger support brackets, etc. Also, the ball screw/nut drive arrangement may be replaced by a rack and pinion drive arrangement. Furthermore, it will be apparent to those skilled in the art that various portions of the invention could be embodied alternatively in analog or digital form as well as in hardware or software based systems. It will also be understood that numerous other improvements and modifications may be made to the preferred embodiment of the invention disclosed herein without departing from the spirit and scope thereof.

What is claimed is:

1. In a feeder plunger operating mechanism for use with at least one feeder plunger, said feeder plunger attached to a support for being vertically reciprocated relative to a frame, the improvement comprising:
   at least one air cylinder attached to said frame, said air cylinder provided with a piston;
   a piston rod, one end of said rod being attached to said piston, the other of said rod attached to said support;
   means for supplying to said cylinder a predetermined amount of air pressure to urge said piston upwardly with a predetermined counterbalancing force.

2. In a feeder plunger operating mechanism comprising:
   a reversible electric motor operatively connected to positively drive at least one plunger in a cyclically reciprocating manner; and
   programmable control means operatively connected to said electric motor to cause its output shaft to oscillate between predetermined limits and according to a predetermined cyclical motion profile thereby causing it to move said at least one plunger in a predetermined manner;
   a method for starting plunger operation comprising the steps of:
   producing a position signal representative of the actual position of said plunger;
   producing a varying first position command signal;
   comparing said first position command signal to said position signal;
   latching said first position command signal to said motor upon a positive comparison between said first position command signal and said position signal;
   ramping said first position command signal to a value representative of a predetermined first height in order to move said plunger to said first height;
   holding said first position command signal at said value representative of said predetermined first height;
   reading from memory a value corresponding to a second height associated with a second position command signal, said second position command signal representative said predetermined cyclical motion profile;
   comparing said second height to said first position command signal value representative of said predetermined first height and upon a positive comparison;
   communicating said second position command signal to said motor to drive said plunger according to said predetermined cyclical motion profile.

3. A feeder plunger operating mechanism comprising:
   a frame;
   a vertical support shaft attached to said frame so as to permit vertical reciprocating motion of said shaft relative to said frame;
   a cantilevered plunger support bracket secured to said vertical support shaft for supporting one or more feeder plungers at the distal end of said plunger support bracket;
   an extension member secured to the other end of said support bracket, comprising
      a first bracket integrally formed with said plunger support bracket, said first bracket having an aperture therethrough in alignment with said threaded rod;
      a second bracket parallel to said first bracket and at a side thereof opposite said motor, said nut being secured to said second bracket; and
      a pair of override air cylinders affixed to said first bracket, the pistons of said cylinders operatively connected to said second bracket, said air cylinders being provided with a predetermined air pressure;
   an electric motor mounted to said frame;
   a threaded rod for being driven by said motor, said rod extending parallel to said vertical support shaft, said rod being rotatable relative to said frame;
   a nut in threaded engagement with said threaded rod and fixedly secured to said extension member; and
   programmable control means operatively connected to said motor for causing same to cyclically oscillate said threaded rod to thereby vertically reciprocate said plunger support bracket according to a predetermined cyclical motion profile.

4. In a feeder plunger operating mechanism for at least one feeder plunger, said feeder plunger being attached to a support which is vertically reciprocated relative to a frame, the improvement comprising:
   a reversible electric motor operatively connected to positively drive said support in a cyclically reciprocating manner; and
   programmable control means operatively connected to said electric motor to cause its output shaft to oscillate between predetermined limits and according to a predetermined motion profile thereby causing it to move said common support in a predetermined manner, said control means comprising transducer means for producing a position signal representative of the instantaneous position of said plunger relative to a reference point;

memory means for storing a predetermined group of command signals;

processing means for addressing said memory means and for reading selected command signals therefrom in a predetermined sequence representative of said predetermined cyclical motion profile;

means responsive to said position signal and said processing means for periodically comparing said position signal with one of said command signals and for producing an error signal representative of the difference therebetween; and servo means responsive to said error signal for producing a control signal to drive said motor to a position to substantially eliminate said error signal.

5. A feeder plunger operating mechanism comprising:
a frame;
a vertical support shaft mounted to said frame so as to permit vertical reciprocating motion of said shaft relative to said frame;
a cantilevered plunger support secured to said vertical support shaft for supporting one or more feeder plungers at the distal end of said plunger support;
an electric motor fixed to said frame, having an output shaft;
an overload linkage demountably coupling the motor output shaft to said vertical support shaft, to uncouple these structures when the vertical force between them exceeds a predetermined limit; and
programmable control means operatively connected to said motor for causing it to oscillate said vertical support shaft and vertically reciprocate said plunger support according to a predetermined motion profile.

6. A feeder plunger mechanism according to claim 5 further comprising:
a vertical guide shaft secured to said frame parallel to said vertical support shaft and adjacent the distal end of said extension member;
guide means secured to said extension member for enabling vertical motion thereof relative to said vertical guide shaft and for limiting transverse motion relative thereto.

7. A feeder plunger operating mechanism according to claim 6 wherein said guide means comprises at least one pair of opposed rollers, each roller rotatably attached to said plunger support.

8. An apparatus according to claim 5 further comprising means for adjusting said frame in two directions in a horizontal plane.

9. An apparatus according to claim 5 wherein said programmable control means further comprises:
transducer means for for producing a position signal representative of the instantaneous position of at least one of said plungers relative to a reference point;
memory means for storing a predetermined group of command signals;
processing means for cyclically addressing said memory means and for reading out the contents thereof in a predetermined sequence representative of said predetermined cyclical motion profile;
means responsive to said position signal and said processing means for periodically comparing said position signal with one of said command signals and for producing an error signal representative of the difference therebetween;
servo means responsive to said error signal for producing a control signal to drive said motor to a position to substantially eliminate said error signal;
means for connecting said control signal to said motor.

10. An apparatus according to claim 9 wherein said memory means further comprises:
additional memory means for storing a plurality of predetermined groups of command signals; and
means for accessing a selected one of said predetermined groups.

11. In a glass feeder assembly for producing gobs of molten glass of a controlled size and rate, including a feeder bowl for containing molten glass, said feeder bowl having a bottom orifice from which the molten glass emerges; a feeder plunger operating mechanism for at least one feeder plunger, said feeder plunger being vertically aligned over the feeder bowl orifice and attached to a support which is vertically reciprocated relative to a frame; and a shears assembly for severing molten glass emerging from the feeder bowl orifice into glass gobs; means for controlling said feeder plunger operating mechanism, comprising:
a reversible electric motor operatively connected to positively drive said common support in a cyclically reciprocating manner; and
programmable control means operatively connected to said electric motor to cause its output shaft to oscillate between predetermined limits according to a predetermined cyclical motion profile, said control means comprising
means for monitoring the position of said feeder plunger over time and for producing plunger position signals;
means for storing a predetermined motion profile for said feeder plunger and for producing plunger command signals representative of desired plunger positions;
servo control means for producing a drive signal for said reversible electric motor and for modifying said drive signal in response to differences between the plunger position signals and the plunger command signals; and
means for coordinating said plunger command signals in time with the operation of said shears assembly.

* * * * *